United States Patent
Saito et al.

(10) Patent No.: US 6,475,599 B1
(45) Date of Patent: Nov. 5, 2002

(54) SUBSTRATE FOR INFORMATION RECORDING MEDIA

(75) Inventors: Yasuhiro Saito, Osaka (JP); Kazuishi Mitani, Osaka (JP); Yoshihiro Matsuno, Osaka (JP); Tatsuro Umeyama, Osaka (JP); Kazuaki Kanai, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 164 days.

(21) Appl. No.: 09/711,931

(22) Filed: Nov. 15, 2000

(30) Foreign Application Priority Data

Nov. 16, 1999 (JP) .............................. 11-325216

(51) Int. Cl.$^7$ ................................. G11B 5/82
(52) U.S. Cl. ................ 428/141; 428/426; 428/694 SG; 360/135; 65/31
(58) Field of Search ................. 428/141, 426, 428/694 SG; 360/135; 65/31

(56) References Cited

U.S. PATENT DOCUMENTS

| | | | | |
|---|---|---|---|---|
| 5,169,703 A | * | 12/1992 | Miyazaki et al. | ............ 428/141 |
| 5,604,014 A | * | 2/1997 | Onodera | ...................... 428/141 |
| 5,985,402 A | * | 11/1999 | Nakamura et al. | .......... 428/65.3 |
| 6,383,404 B1 | * | 5/2002 | Sakai et al. | ..................... 65/31 |

* cited by examiner

*Primary Examiner*—Stevan A. Resan
(74) *Attorney, Agent, or Firm*—Sughrue Mion, PLLC

(57) ABSTRACT

A substrate for information recording media is disclosed which has optimized shapes of surface recesses and protrusions and thereby contributes to a reduction in flying height and causes neither head crushing nor thermal asperities.

The substrate for information recording media has surface recesses and protrusions wherein the height thereof at a contact proportion for the recesses and protrusions of 0.4% is from 2 to 7 nm when the height of the recesses and protrusions at a contact proportion therefor of 50% is taken as a base. The contact proportion is a value based on the bearing ratio determined with an atomic force microscope.

8 Claims, 2 Drawing Sheets

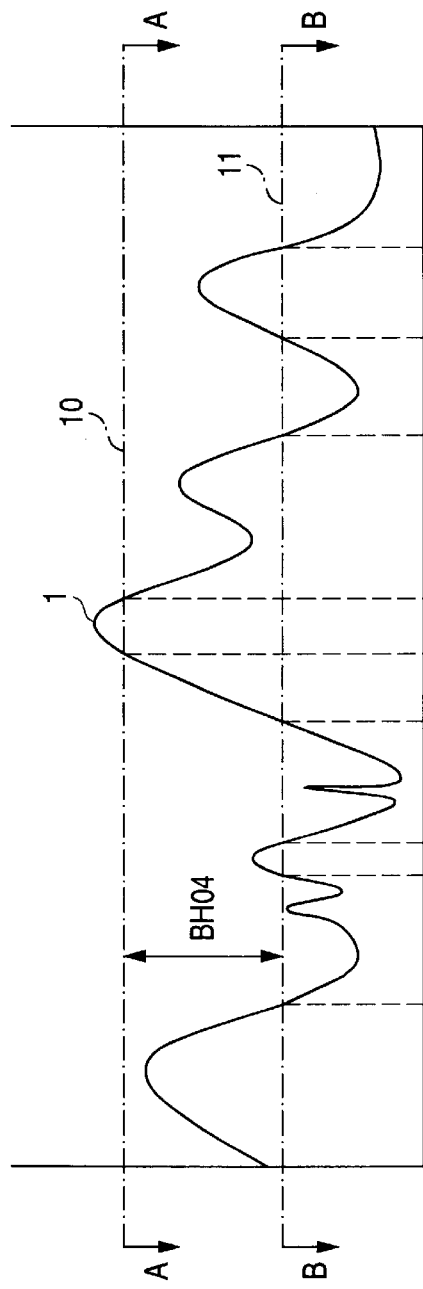
FIG. 1 (a)
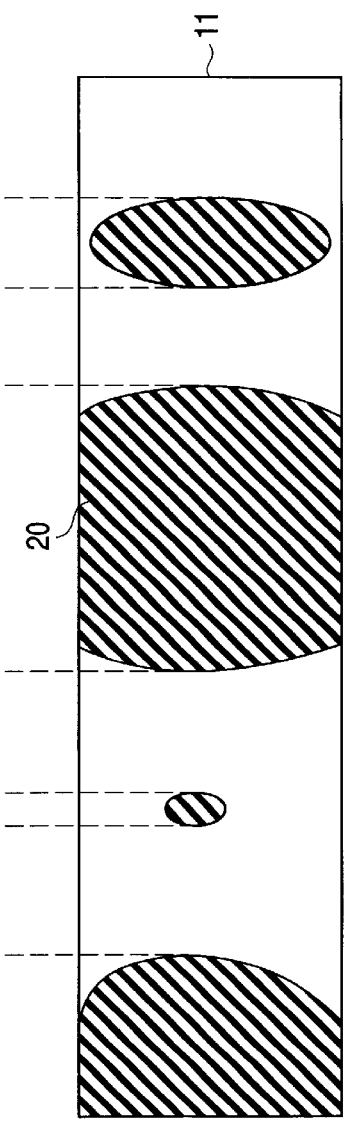
FIG. 1 (b)
FIG. 1 (c)

SUBSTRATE FOR INFORMATION RECORDING MEDIA

FIELD OF THE INVENTION

The present invention relates to an information recording medium for use in information recording devices such as hard disks and to the substrate thereof. More particularly, the invention relates to an information recording device which uses an information recording medium substrate wherein the surface recesses and protrusions have shapes within a given range and which thereby attains a higher information recording density and a higher information recording speed.

BACKGROUND OF THE INVENTION

With remarkable progress in handling digital information in recent years, various devices for storing such information therein have been developed and produced. Improvements in these devices are ever-progressing, and the information recording capacity and the speed of recording/reproducing are increasing at an annual rate of tens of percents. Under these circumstances, the information recording devices which are currently used most widely are hard disks, and they are being improved at a higher rate than the other devices.

Hard disks have an information recording layer formed on a substrate for information recording media (hereinafter referred to simply as "substrate"), and information is recorded in this recording layer and reproduced with a magnetic head. At present, hard disks of the type called CSS or ramp road are generally used. In the CSS type, also called the contact-start-stop type, a magnetic head glides over the data zone of the disk when the substrate is rotating, and slides on the CSS zone of the substrate when the substrate stops and begins to rotate. The CSS zone of a substrate means that part of the substrate which has uniform recesses and protrusions which have been purposely formed and have a height on the order of tens of nanometers (such recesses and protrusions are formed mainly along the inner or outer periphery). In the ramp road type, a magnetic head glides over the substrate when the substrate is rotating, and is put in a housing position upon substrate stopping. This ramp road type does not necessitate a CSS zone because of the mechanism. In recent years, a hard disk called contact type is being investigated in which a magnetic head is always in contact with the substrate.

However, the conventional techniques have had the following problems. While the substrate of the CSS type or ramp road type is rotating, the magnetic head glides over the surface (information recording zone) of the substrate at a distance on the order of tens of nanometers (hereinafter, this distance is referred to as "flying height"). It is therefore necessary to reduce the flying height for attaining a higher information recording density. However, in substrates having large surface recesses and protrusions, there is a higher possibility that the magnetic head might collide with protrusions on the substrate surface during rotation to cause head crushing. Even though the collision does not result in head crushing, there is a fear that the so-called thermal asperities may occur, in which the magnetic head detects abnormal signals and erroneously operates due to the heat resulting from the collision. In particular, since high-sensitivity MR heads or GMR heads have come to be mainly used recently, the problem concerning thermal asperities has become more serious.

It has been thought that the head crushing and thermal asperities attributable to collisions with protrusions present in the image recording zone can be avoided by reducing the sizes of the recesses and protrusions on that zone. Consequently, substrates having smaller surface recesses and protrusions have been regarded as substrates having higher performances. As a result of investigations made by the present inventors, however, it has been found that although reducing the sizes of the surface recesses and protrusions of a substrate surely reduces the frequency of head crushing, too small recesses and protrusions impair the flying stability of a magnetic head, rather than improving it, and result in an increased frequency of contacts between the magnetic head and the substrate surface and in a heightened possibility of head crushing. The reasons why the flying stability of a magnetic head thus decreases have not been elucidated. However, the present inventors presume that contacts of a magnetic head with a substrate are unavoidable because the head glides over the information recording zone while swaying, and that the smaller the surface recesses and protrusions present on the information recording zone, the higher the frictional force. The unavoidable contacts and the increased frictional force are thought to contribute to head crushing. Especially recently, considerably small flying heights are used for heightening recording density. It is therefore thought that the head crushing attributable to magnetic-head swaying has become more apt to occur.

Although information recording devices are required to attain an increase in recording capacity and an increase in the speed of recording/reproducing so as to cope with the trend toward handling of digital information as described above, they are strongly required to be more lightweight and smaller than conventional ones. In order for a substrate to satisfy these inconsistent requirements, it should have not only optimal shapes of surface recesses and protrusions but high rigidity and a high modulus of elasticity.

SUMMARY OF THE INVENTION

The invention has been achieved in view of the above-described problem noticed by the present inventors.

One object of the invention is to provide a substrate which has optimized shapes of surface recesses and protrusions and which therefore contributes to a reduction in flying height and causes neither head crushing nor thermal asperities.

Another object of the invention is to provide an information recording device which uses this substrate and attains a higher information recording density, a higher speed of recording/reproducing, and a smaller size.

These objects are accomplished with a substrate for information recording media which has surface recesses and protrusions wherein the height thereof at a contact proportion for the recesses and protrusions of 0.4% as determined with an atomic force microscope (AFM) is from 2 to 7 nm when the height of the recesses and protrusions at a contact proportion therefor of 50% is taken as a base.

In a preferred embodiment of the substrate of the invention described above, the height of the surface recesses and protrusions at a contact proportion therefor of 0.1% is from 2 to 10 nm.

In another preferred embodiment of the substrate of the invention described above, the protrusions in the surface recesses and protrusions have a diameter of from 10 to 1,000 nm.

Still another preferred embodiment of the substrate of the invention described above comprises a glass or crystallized glass as the base material.

The invention further provides a process for producing a substrate which comprises immersing a substrate comprising a glass or crystallized glass as the base material in an acid and an aqueous alkali solution to thereby form the shapes of surface recesses and protrusions described above.

The invention furthermore provides an information recording medium which comprises the substrate described above and, successively deposited thereon, at least an undercoat film, a magnetic film, and a protective film.

The invention still further provides a magnetic recording device employing the information recording medium described above.

A preferred embodiment of the information recording device of the invention described above is of the ramp road type.

BRIEF DESCRIPTION OF THE DRAWINGS

FIG. 1A is diagrammatic view concerning bearing ratio.

FIG. 1B is a sectional view taken on the chain line A—A.

FIG. 1C is a sectional view taken on the chain line B—B.

DESCRIPTION OF THE REFERENCE NUMERALS

Figure 2:
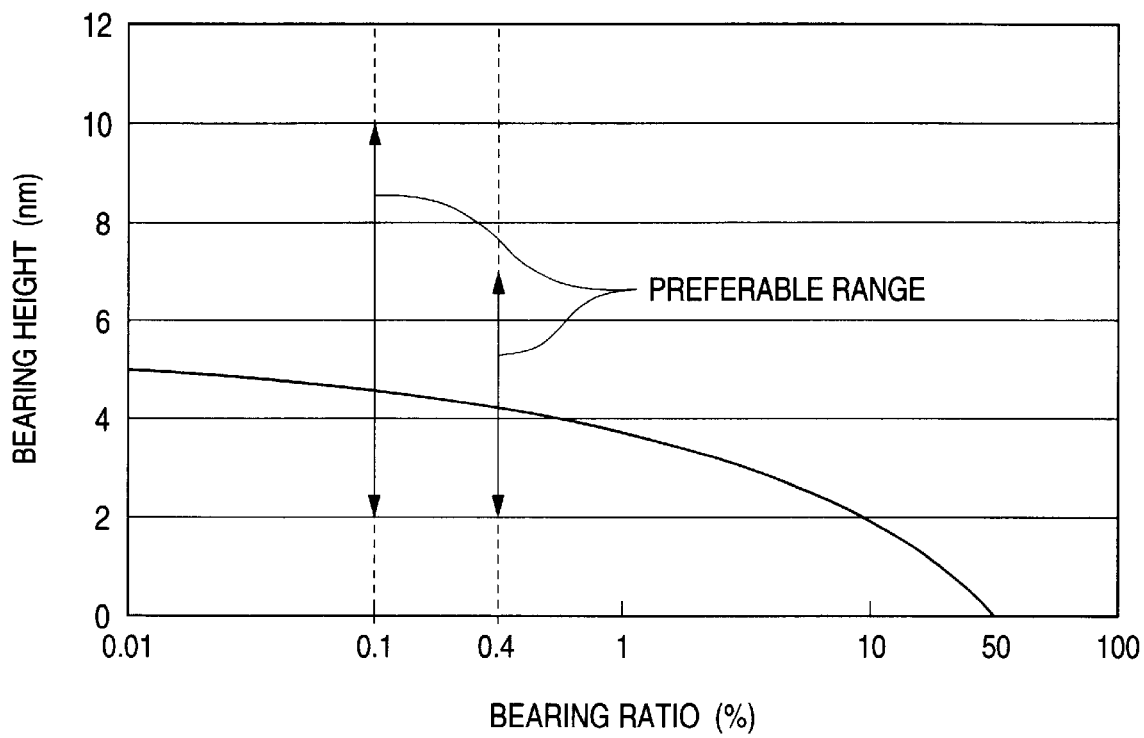
FIG. 2 is a graphic presentation showing the typical relationship between bearing ratio and bearing height.

1: Shapes of surface recesses and protrusions on glass. substrate

10: Slicing plane at bearing ratio of 0.4%

11: Slicing plane at bearing ratio of 50% (base plane)

20: Section of glass substrate protrusion on slicing plane

DETAILED DESCRIPTION OF THE INVENTION

Modes for carrying out the invention will be explained below in detail. However, the invention should not be construed as being limited to the following modes.

As described above, for eliminating the problem concerning head crushing and thermal asperities, it is necessary to optimize the shapes of the recesses and protrusions present on a substrate surface. There are various criteria for evaluating the shapes of surface recesses and protrusions. Since each criterion has its own feature, substrates having the same value in one criterion can utterly differ from each other in the actual shapes of surface recesses and protrusions.

The average surface roughness $R_a$, which has conventionally been frequently used as a criterion for evaluating the shapes of surface recesses and protrusions, is the value obtained by integrally averaging the depths/heights of all recesses and protrusions present on a given measurement line on the surface to be examined. Consequently, even when recesses far deeper than others or protrusions far higher than others are present in a small number, the value of $R_a$ does not reflect the presence of such recesses or protrusions and can be used only for evaluating the surface state in terms of general surface roughness. When protrusions far higher than others are present even in a small number, head crushing or thermal asperities occur. Because of this, $R_a$ is insufficient when used alone as a criterion for the desired evaluation of the shapes of surface recesses and protrusions.

There also is the ten-point-average surface roughness $R_z$. $R_z$ is the value obtained by merely averaging the depths/ heights of the five deepest recesses/five highest protrusions among all recesses and protrusions present in a given area in the surface to be examined. Consequently, for example, in the case where only one protrusion far higher than others is present, the average value is apparently small, posing the same problem as $R_a$. In contrast, in the case where two or more recesses far deeper than others are present, the value of $R_z$ is apparently large. However, not the depth of recesses but the height of protrusions is important for head crushing and thermal asperities and, hence, even a substrate having a large value of $R_z$ can be a preferred substrate. Consequently, $R_z$ is insufficient when used alone as a criterion, like $R_a$.

In view of those drawbacks, there may be a method in which $R_a$ and $R_z$ are used in combination and $R_z/R_a$ is used for evaluation. In this case, meaner values are obtained as compared with the case of using $R_a$ or $R_z$ alone, and this criterion can be used practically. However, $R_z/R_a$ is ineffective in drastically mitigating the problems concerning the concealment of a protrusion by averaging the heights of protrusions and concerning the overestimation of recesses, and is also insufficient as a criterion.

In order to thoroughly eliminating those problems, a criterion in which attention is directed only to the protrusions of a substrate surface to evaluate the shapes of the protrusions is used to evaluate the shapes of the surface recesses and protrusions of the substrate. Specifically, in this method, the height of the surface recesses and protrusions at a contact proportion of 50% is taken as a base, and whether or not the height thereof at a contact proportion therefor is 0.4% [bearing height (BH04)] is within the range of from 2 to 7 nm is used as a criterion. Contact proportion is a value represented by bearing ratio and is determined with an atomic force microscope (AFM). Bearing ratio is the proportion of the area of the sections of surface protrusions formed by slicing the substrate surface along a given plane to the area of the slicing plane. Consequently, when the contact proportion is 50%, the sections of protrusions account for a half of the slicing plane (FIG. 1C). When the slicing plane at a contact proportion of 50%, which is taken as a base plane, is shifted parallel toward the tops of protrusions, then the contact proportion gradually becomes small. The distance over which the slicing plane has been shifted until the contact proportion becomes 0.4% (FIG. 1B) corresponds to the height at a contact proportion of 0.4% (BH04). Namely, it has been found that when the distance over which the slicing plane corresponding to a contact proportion of 50% has been shifted until the contact proportion becomes 0.4% is in the range of from 2 to 7 nm, then this substrate is capable of eliminating the problems concerning head crushing and thermal asperities. In FIG. 1 are shown diagrammatic views for illustrating bearing height. FIG. 2 briefly shows the relationship between bearing ratio and bearing height using a typical example of the invention.

This criterion was found out and has come to be used first through many experiments made by the present inventors on the shapes of surface recesses and protrusions of substrates and through analyses of the results thereof. Specifically, the present inventors made detailed comparative investigations on the relationship between a magnetic head and substrate surfaces with respect to the contact therebetween and the flying stability of a magnetic head. As a result, the bearing height of a substrate surface was found to be a parameter directly related to the flying stability of a magnetic head. This finding was the first step toward the invention. In this connection, many information recording media differing in BH04 were produced and subjected to a magnetic-head fixed-point flying test at a reduced pressure (200 Torr=26.7 kPa). Part of the results of this testis given in FIG. 3. Since the flying height of a magnetic head generally becomes smaller with decreasing ambient pressure, contacts between the magnetic head and the substrate are more apt to occur at a reduced pressure. Consequently, the test conducted at a reduced pressure is regarded as a kind of accelerated test for examining head crushing resistance.

With respect to the CSS type, various investigations have conventionally been made on the shapes of recesses and protrusions present on substrate surfaces, and preferred ranges of various parameters such as, e.g., $R_a$, $R_{max}$, $R_p$ protrusion density, protrusion height, and protrusion size have been proposed. However, these investigations were intended to optimize the surface roughness with respect to friction and wear in a CSS zone and neither the flying stability of a magnetic head flying at a small height over a data zone nor thermal asperities caused by such a magnetic head are taken in account therein.

Figure 3:
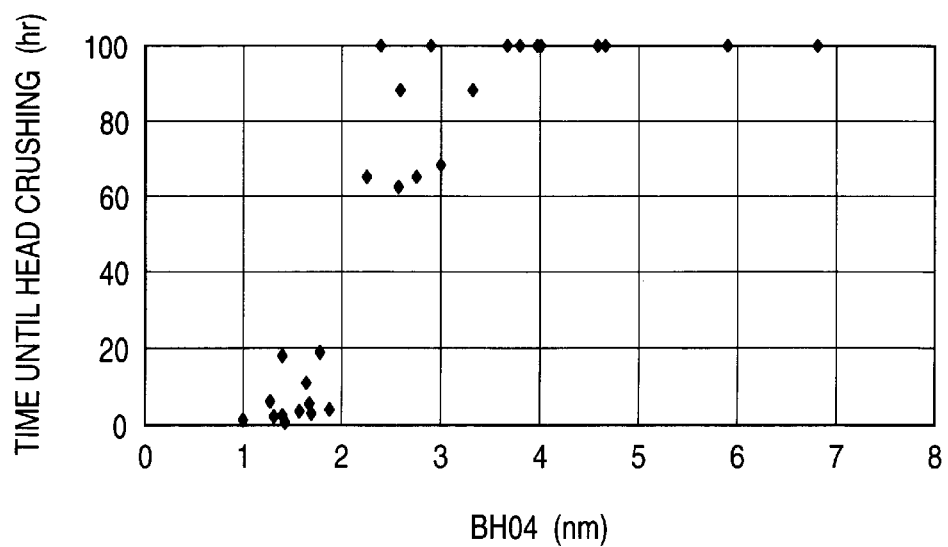
FIG. 3 is a presentation showing the correlation between BH04 and head crushing.

As shown in FIG. 3, when BH04 is smaller than 2 nm, head crushing tends to occur in several hours. This may be because the flying stability of a magnetic head abruptly decreases as BH04 becomes smaller beyond 2 nm. On the other hand, when BH04 exceeds 7 nm, the probability of head crushing attributable to collisions with protrusions far higher than others increases and the frequency of occurrence of thermal asperities also increases.

BH04 is preferably from 3 to 6.5 nm, more preferably from 3.5 to 6.0 nm. The reason why the lower limit thereof is 3 or 3.5 nm is that since the substrate undergoes a dust particle-removing step called tape burnishing when processed for producing an information recording medium, that lower limit provides room for grinding in the step. Due to the lower limit, which is regulated to such a relatively large value, substrates having the desired performance can be produced in an improved yield. On the other hand, by regulating the upper limit of BH04 to a small value, the frequency of head crushing can be reduced even in the case where the design flying height is small. In addition, the small value of upper limit is effective in improving the reliability of the information recording device used in a severe environment having a low pressure, as on high mountains.

The recesses and protrusions present on the substrate surface preferably have such shapes that the height thereof at a contact proportion of 0.1%, BH01, is from 2 to 10 nm when the height thereof at a contact proportion of 50% is taken as a base height. This is because when BH01 exceeds 10 nm, the probability of head crushing increases, as will be demonstrated in Examples to be given later. Usually, BH01≧BH04.

The substrate surface preferably has an $R_a$ (three-dimensional) of from 0.3 to 1.2 nm. Values of $R_a$ (three-dimensional) smaller than 0.3 nm result in insufficient mechanical durability of the protrusions, while values of $R_a$ (three-dimensional) exceeding 1.2 nm result in impaired magnetic-head flying stability.

A detailed explanation is given below on $R_a$ (three-dimensional). $R_a$ (three-dimensional) is a parameter obtained by three-dimensionally extending the center-line average roughness defined in JIS B 0601 so that this roughness is applicable to a measurement area (10×10 μm). In an examination with an AFM, this $R_a$ is defined by the following equation (1):

$$R_a \text{(three-dimensional)} = (1/n)\sum_{i=1}^{n} \text{abs}(Zi - Z0) \quad (1)$$

wherein n is the number of AFM data points; "abs" indicates absolute number; Zi is the value of AFM data for the ith point; and Z0 is the value obtained with the following equation (2).

$$Z0 = (1/n)\sum_{i=1}^{n} Zi \quad (2)$$

On the substrate surface, the protrusions may be scatteringly or continuously present. In either case, the protrusions preferably have a diameter of from 10 to 1,000 nm. The term "diameter of a protrusion" herein means the diameter of the section thereof formed by cutting the protrusion along a plane corresponding to the midpoint of the distance between the base line for the protrusion and the top thereof (i.e., corresponding to a half of the height of the protrusion). Diameters thereof smaller than 10 nm are undesirable from the standpoint of production management because such protrusions themselves have impaired mechanical durability so that an undesirably thick surface layer is removed from the substrate in the tape burnishing step. On the other hand, diameters thereof exceeding 1,000 nm adversely influence information recording/reproducing characteristics. This is attributable to the fact that the heights and widths of such protrusions are too large as compared with the current recording bits and, hence, the protrusions on the substrate surface considerably differ from the recesses of the surface in distance to the magnetic head. Consequently, the diameter of the protrusions present on the substrate surface is more preferably from 20 to 300 nm, most preferably from 30 to 100 nm. As long as the diameter of the protrusions is within this range, both mechanical durability and information recording/reproducing characteristics can be optimized.

The base material of this substrate is not particularly limited in kind, and can be any of materials which have conventionally been used. Examples thereof include aluminum alloys, carbon, glasses, crystallized glasses, plastics such as polycarbonates and polyolefins, and silicon. Of these, glasses and crystallized glasses are preferred base materials because they have high surface smoothness, can be easily surface-processed, and have a high modulus of elasticity and high rigidity and strength.

For processing a substrate so that its surface recesses and protrusions come to have a BH04 of from 2 to 7 nm, use may be made of a known method of mechanical polishing in which the polishing conditions are more precisely regulated. However, in the case of a substrate wherein the base material is an amorphous glass or crystallized glass (hereinafter, referred to simply as "glass substrate"), a simpler method can be used for realizing the surface shape. This method comprises immersing the glass substrate in an aqueous acid or alkali solution two or more times. For example, the glass substrate is immersed in an aqueous acid solution and then in an aqueous alkali solution. The mechanism by which surface recesses and protrusions are formed in this method is presumed to be as follows. When the substrate is first immersed in an aqueous acid solution, components having poor acid resistance selectively dissolve away from a surface layer of the glass substrate, laving a framework layer of silicon dioxide. Upon subsequent immersion in an aqueous alkali solution, the framework of silicon dioxide is selectively corroded. By suitably regulating conditions such as the concentration of each of these treatment solutions and the immersion time, the substrate surface can be etched so as to result in any desired surface shape. There is no need of alternately immersing the substrate in an aqueous acid solution and an aqueous alkali solution. Even when an aqueous acid solution alone is used, the same effect can be obtained by suitably regulating the concentration of the aqueous acid solution and the immersion time. The number of repetitions of immersion in these solutions is preferably 2, from the standpoint of reducing the number of processing steps. However, the number thereof in the case of using an aqueous acid solution alone is preferably from 2 to 4 because the larger the number of repetitions of the processing, the higher the uniformity of the surface recesses and protrusions.

The kind of the acid or alkali in the aqueous solution is not particularly limited. Examples of the acid include inorganic acids such as hydrofluoric acid (HF), hydrosilicofluoric acid ($H_2SiF_6$), nitric acid ($HNO_3$), phosphoric acid ($H_3PO_4$), sulfamic acid ($HSO_3$. $NH_2$), and sulfuric acid ($H_2SO_4$) and organic acids such as tartaric acid ($HOOC(CHOH)_2COOH$), acetic acid ($CH_3COOH$), citric acid ($C_6H_8O_7$. $H_2O$), oxalic acid ($HOOCCOOH2H_2O$), and malic acid ($COOHCH_2CHOHCOOH$). Examples of the alkali include inorganic alkalis such as sodium hydroxide and potassium hydroxide and organic alkalis such as ammonia ($NH_3$).

Of these acids, hydrofluoric acid and hydrosilicofluoric acid are worthy of positive use because they not only accelerate the selective dissolution of components having poor acid resistance as described above, but dissolve even the silicon oxide framework therein. Even with either of the two acids only, fine recesses and protrusions can be formed on a substrate surface while freely regulating the thickness to be removed by dissolution and the rate of dissolution, by regulating the concentration of the acid. These acids may be used as a mixture with other acid(s) for the purpose of cleaning, etc. Such aqueous solutions may contain a detergent, e.g., a surfactant or chelating agent, so as to more effectively perform their cleaning function. In the case where the conditions for the treatment with an aqueous acid solution include a high acid concentration and a short immersion time, the substrate thus treated has a relatively large value of $R_a$.

This etching treatment may be conducted at any stage after polishing in a process for glass substrate production without particular limitations. However, the following should be noted. Glass substrates are frequently subjected to chemical strengthening by ion exchange. In this case, it is preferred to conduct the etching treatment prior to chemical strengthening in order to protect the compression stress layer to be formed on the substrate surface. In the case where the etching treatment is conducted after chemical strengthening, the thickness to be removed by the etching is preferably regulated to 1 μm or smaller in order to protect the compression stress layer.

In the etching treatment, the surface of the glass substrate can be cleaned by applying ultrasonic to the substrate. Although suitably regulating the acid or alkali concentration and the time for the treatment is also effective in cleaning, it is necessary in this case to carefully select conditions so as not to considerably change the shapes of the surface recesses and protrusions. The thickness of the surface layer to be removed by cleaning after the etching treatment is preferably 10 nm or smaller from the standpoint of preventing the shapes of the surface recesses and protrusions from changing.

The kind of the glass substrate is not particularly limited. However, preferred examples thereof include: a soda-lime glass comprising silicon dioxide, alkali metal oxides, and alkaline earth metal oxides as main components; an aluminosilicate glass comprising silicon dioxide, aluminum oxide, and alkali metal oxides as main components; a borosilicate glass comprising silicon dioxide and a boron oxide as main components; an $Li_2O$—$SiO_2$ glass comprising lithium oxide and silicon dioxide as main components; an $Li_2O$—$Al_2O_3$—$SiO_2$ glass comprising lithium oxide, silicon dioxide, and aluminum oxide as main components; an RO—$Al_2O_3$—$SiO_2$ glass comprising the oxide of an element giving a bivalent stable cation, represented by an alkaline earth metal, aluminum oxide, and silicon dioxide as main components (provided that RO represents magnesium oxide MgO, calcium oxide CaO, strontium oxide SrO, barium oxide BaO, zinc oxide ZnO, nickel oxide NiO, manganese oxide MnO, etc.); and crystallized glasses obtained from these. Aluminum oxide, alkali metal oxides, and alkaline earth metal oxides are ingredients which are apt to dissolve in an aqueous acid solution, and a glass substrate containing these ingredients in moderate amounts can be relatively easily etched. Examples of this glass substrate include an aluminosilicate glass having the composition shown below.

Hereinafter, all percents are by mole unless otherwise indicated.

silicon dioxide ($SiO_2$): 55–70% aluminum oxide ($Al_2O_3$): 1–12.5% lithium oxide ($Li_2O$) 5–20% sodium oxide ($Na_2O$): 0–14% potassium oxide ($K_2O$): 0–3% magnesium oxide (MgO): 0–8% calcium oxide (CaO): 0–10% strontium oxide (SrO): 0–6% barium oxide (BaO): 0–2% titanium dioxide ($TiO_2$): 0–8% zirconium oxide ($ZrO_2$) : 0–4%

In this composition, each component performs its own function and the preferred range of the content thereof is determined based on the function. $SiO_2$ is an essential component capable of constituting a glass framework. If the content thereof is lower than 55%, the composition has a considerably elevated liquidus temperature and the glass melt has an exceedingly low viscosity and an increased rate of the progress of devitrification, making it difficult to form a homogeneous glass. On the other hand, if the content of $SiO_2$ exceeds 70%, not only the composition has an elevated liquidus temperature but the glass melt has an exceedingly high viscosity, making it difficult to give a homogeneous glass.

$Al_2O_3$ is an essential component which improves the modulus of elasticity and water resistance of the glass composition and increases the thickness of a compression stress layer to be formed by ion exchange. If the content of $Al_2O_3$ is lower than 1%, these effects are insufficient. On the other hand, contents thereof exceeding 12.5% result in impaired meltability. In this case, however long the batch is heated, complete melting may be impossible. Even when the batch has melted completely, this composition is highly susceptible to devitrification upon cooling/solidification and glass formation is difficult. Consequently, the content of $Al_2O_3$ is preferably from 1 to 12.5%. The term "batch" means a mixture prepared by mixing raw glass materials together in such a proportion as to result in a glass made up of components contained in respective given amounts.

$Li_2O$ is an essential component which greatly improves the modulus of elasticity of the glass and undergoes ion replacement in chemical strengthening. It serves also to lower the melting temperature of the batch and thus enhance meltability. $Li_2O$ is thought to further serve to increase the rate of polishing for obtaining a mirror surface. Because of this, the content thereof is preferably as high as possible. The lower limit of $Li_2O$ content is preferably 5%. If the content of $Li_2O$ is lower than 5%, an ion-exchange treatment is less effective in improving the glass strength because the amount of ions which are replaced by the treatment is insufficient. On the other hand, the upper limit thereof is preferably 20% from the standpoint of securing the contents of other components. Consequently, the content of $Li_2O$ is preferably from 5 to 20%.

$Na_2O$ is an optional component which, like $Li_2O$, undergoes ion replacement in an ion-exchange treatment. $Na_2O$ is highly effective in lowering the melting temperature and liquidus temperature of the glass to enhance meltability and in heightening the rate of mirror polishing. Especially when incorporated in a small amount, $Na_2O$ greatly heightens the stability of the glass. On the other hand, incorporation of $Na_2O$ in too large an amount results in reduced contents of the other components serving to improve modulus of elasticity. Because of this, the content of $Na_2O$ is preferably 14% or lower.

If the total content of $Li_2O$ and $Na_2O$ ($R_2O$) is lower than 5%, this glass undergoes insufficient ion exchange and the batch has poor meltability. On the other hand, if the total content thereof exceeds 30%, the glass melt is apt to become milk-white and suffer devitrification, making it difficult to form a transparent glass. Consequently, the content of $R_2O$ is preferably from 5 to 30%.

$K_2O$ has desirable functions, e.g., enhancement of batch meltability. However, if the content thereof is too high, the glass obtained through ion exchange has a reduced surface compression stress. Consequently, $K_2O$ is an optional component and the content thereof is preferably 3% or lower.

MgO is a component which serves to homogenize the glass and improve the modulus of elasticity thereof. However, if MgO is contained in too large an amount, it excessively elevates the liquidus temperature of the glass. Consequently, MgO is an optional component. The content of MgO is determined so as to balance the improvement in modulus of elasticity with the impairment in liquidus temperature, and is preferably from 0 to 8%.

CaO is an optional component which, like MgO, improves modulus of elasticity and enhances batch meltability. Although superior to MgO in enhancing the devitrification resistance of a glass, CaO has a drawback that it slightly increases the density of the glass. Because of this, an increase in density and deterioration in devitrification resistance are taken in account in determining the content of CaO. Specifically, the content thereof is preferably 10% or lower, more preferably 6% or lower.

SrO is an optional component which, like MgO and CaO, enhances batch meltability. When incorporated even in a small amount, SrO greatly improves the devitrification resistance of the glass. However, the content of SrO is regulated to a small value because SrO not only is less effective than MgO and CaO in improving the modulus of elasticity of the glass but considerably increases the density thereof. From the standpoint of regulating the glass so as to have an appropriate density, the content of SrO is preferably 6% or lower.

BaO functions to enhance batch meltability and lower the liquidus temperature. However, since BaO has a high specific gravity and is expensive, too high contents thereof result in an excessively heightened glass density and an increased production cost. Because of this, BaO is an optional ingredient and the content thereof is preferably 2% or lower.

$TiO_2$ serves to homogenize the glass and greatly improve the modulus of elasticity thereof, although it is an optional component. Consequently, $TiO_2$ is an ingredient which should be incorporated in preference to other optional components. However, as apparent from the fact that a relatively large amount of $TiO_2$ is contained in milk-white glasses, it has a side-effect of making a glass milk-white. Because of this, the content of $TiO_2$ is preferably from 0 to 8%.

$ZrO_2$ is an optional component which, like $TiO_2$, heightens the modulus of elasticity of the glass and improves the weatherability thereof. Furthermore, as apparent from the fact that $ZrO_2$ is used as a nucleating agent for crystallized glasses, it accelerates the devitrification of a glass. $ZrO_2$ further has a side-effect of increasing the density of a glass. Consequently, the content of $ZrO_2$ is preferably 4% or lower from the standpoint of avoiding devitrification and an increase in density.

In the case where melt formability and the chemical resistance required for cleaning are important for the glass having the composition described above, this glass preferably comprises 62 to 69% silicon dioxide ($SiO_2$), 6 to 12% aluminum oxide ($Al_2O_3$), 5 to 14% lithium oxide ($Li_2O$), 6 to 14% sodium oxide ($Na_2O$), 0 to 3% potassium oxide ($K_2O$), 0 to 5% magnesium oxide (MgO), 0 to 7% calcium oxide (CaO), 0 to 3% titanium dioxide ($TiO_2$), and 0 to 3% zirconium oxide ($ZrO_2$). In the case where the glass having a composition within this range has a zirconium oxide ($ZrO_2$) content of especially from 0 to 2%, this glass is advantageous in that large crystals are less apt to precipitate during the melting/forming of the glass. This is because there are cases where crystals of $ZrO_2$ grow to a size larger than those of the recesses and protrusions present in a CSS zone, and the presence of such large crystals significantly increases the frequency of head crushing. Furthermore, the total content of magnesium oxide (MgO) and calcium oxide (CaO) in this glass is preferably from 0.5 to 12%, because this results in improved batch meltability.

In the case where a high modulus of elasticity is required, a glass having the following composition is preferred, which has the chemical resistance required for cleaning and on which the desired shapes of surface recesses and protrusions can be easily formed. The preferred composition comprises 55 to 65% silicon dioxide ($SiO_2$), 0.5 to 6.0% aluminum oxide ($Al_2O_3$), 12 to 22% lithium oxide ($Li_2O$), 0.5 to 6.0% sodium oxide ($Na_2O$) 0 to 1% potassium oxide ($K_2O$), 3 to 12% magnesium oxide (MgO), 0 to 12% calcium oxide (CaO), 0 to 10% strontium oxide (SrO), 0 to 6% titanium dioxide ($TiO_2$), and 0 to 3% zirconium oxide ($ZrO_2$), provided that the total content of MgO, CaO, and SrO is from 10 to 25%.

Besides the major components described above, other ingredients can be further added for the purposes of melt clarification, regulation of the viscosity of the glass melt, regulation of liquidus temperature, and others (such other ingredients are hereinafter referred to as "additional ingredients"). For example, $Fe_2O_3$, MnO, NiO, $Cr_2O_3$, or CoO functions as a colorant, while $SO_3$, $As_2O_3$, or $Sb_2O_3$ functions as a clarificant. The upper limit of the content of such additional ingredients is 5%. Glasses in which the content of the additional ingredients exceeds 5% are highly apt to suffer devitrification. Besides being purposely added, such additional ingredients may be contained as impurities in the raw materials for major components and thus come into the glass. If the content of the additional ingredients exceeds 5%, the contents of major components are considerably influenced and the glass comes to show properties of the additional ingredients. On the other hand, there frequently are case where additional ingredients contained as impurities in the raw materials for major components come into the glass in an amount of up to about 2%.

A crystallized glass such as an $Li_2O$—$SiO_2$ glass comprising lithium oxide crystals and silicon dioxide as main components, an $Li_2O$—$Al_2O_3$—$SiO_2$ glass comprising lithium oxide, silicon dioxide, and aluminum oxide as main components, an RO—$Al_2O_3$—$SiO_2$ glass comprising an alkali metal oxide or the like, aluminum oxide, and silicon dioxide as main components (provided that RO represents magnesium oxide MgO, calcium oxide CaO, strontium oxide SrO, barium oxide BaO, zinc oxide ZnO, nickel oxide NiO, manganese oxide MnO, etc.), or the like is obtained by holding the corresponding amorphous glass for several hours at a temperature around the softening point thereof to thereby precipitate crystals within the glass. This crystallization treatment has a disadvantage of increasing the cost of substrate production because it necessitates its own step and time. However, crystallized glasses have higher moduli of elasticity and higher strengths than amorphous glasses and are suitable for use as substrates required to have these properties.

The concentration of the aqueous acid or alkali solution is not particularly limited, but should be regulated while fully taking account of the chemical resistance of the glass to be treated. In particular, care should be taken because glasses considerably differ in acid resistance depending on the contents of components. For example, the acid resistance of aluminosilicate glasses varies in proportion to the difference between the content of $SiO_2$ and that of $Al_2O_3$ and, hence, the acid concentration for an aluminosilicate glass should be determined based on this difference. Specifically, in the case of a glass comprising 64 to 68% silicon dioxide ($SiO_2$), 9 to 11% aluminum oxide ($Al_2O_3$), 6 to 8% lithium oxide ($Li_2O$), 8 to 11% sodium oxide ($Na_2O$), 0 to 1% potassium oxide ($K_2O$), 2 to 4% magnesium oxide (MgO), 3 to 5% calcium oxide (CaO), 0 to 3% titanium dioxide ($TiO_2$), and 0 to 3% zirconium oxide ($ZrO_2$), the acid concentration is preferably from 0.001 to 0.06% by weight for hydrofluoric acid and from 0.003 to 0.5% by weight for hydrosilicofluoric acid. If an aqueous acid solution having a concentration higher than the upper limit is used, the glass is etched at too high a rate, resulting in impaired controllability. On the other hand, too low acid concentrations result in too low an etching rate, making it difficult to apply the etching to practical production.

Especially in the case of a glass which comprises 67% silicon dioxide ($SiO_2$), 10% aluminum oxide ($Al_2O_3$), 7% lithium oxide ($Li_2O$), 8.7% sodium oxide ($Na_2O$), 0.3% potassium oxide ($K_2O$), 3% magnesium oxide (MgO), and 4% calcium oxide (CaO) and in which $SiO_2$—$Al_2O_3$=57%, the acid concentration is preferably from 0.02 to 0.06% by weight for hydrofluoric acid and from 0.1 to 0.5% by weight for hydrosilicofluoric acid.

Furthermore, in the case of a glass which comprises 65% silicon dioxide ($SiO_2$), 10% aluminum oxide ($Al_2O_3$), 7% lithium oxide ($Li_2O$), 10.7% sodium oxide ($Na_2O$), 0.3% potassium oxide ($K_2O$), 3% magnesium oxide (MgO) and 4% calcium oxide (CaO) and in which $SiO_2$—$Al_2O_3$=55%, the acid concentration is preferably from 0.003 to 0.015% by weight for hydrofluoric acid and from 0.03 to 0.15% by weight for hydrosilicofluoric acid.

The etching treatment of an aluminosilicate glass having the composition described above is preferably conducted by a two-stage treatment method, which comprises first immersing the glass in an aqueous acid solution (10 to 70° C.) having a concentration within the range shown above for from 0.1 to 30 minutes, subsequently rinsing the glass with pure water or the like, and then immersing the glass in an aqueous alkali solution (10 to 70° C.) having a pH of from 9 to 14 for from 0.1 to 30 minutes. In this method, if an aqueous acid solution having a concentration lower than the lower limit shown above is used in the former stage, dissolution does not sufficiently proceed because of the limited treatment time in practical production and this tends to result in a BH04 outside the range of from 2 to 7 nm. Conversely, if the acid concentration exceeds the upper limit shown above, the glass dissolution rate becomes too high and this tends to result in impaired evenness of BH04 and reduced controllability, making it difficult to apply the etching to practical production. On the other hand, if an aqueous alkali solution having a pH lower than the lower limit shown above is used in the latter stage, the framework of silicon dioxide undergoes insufficient dissolution in practical production, so that a surface layer having a modified composition remains and the glass substrate thus treated has reduced chemical durability. If the pH of the alkali solution exceeds the upper limit shown above, the framework undergoes excessive dissolution and this tends to result in impaired evenness of BH04, making it difficult to apply the etching the practical production due to reduced controllability.

An information recording medium is produced by successively depositing on this substrate at least an undercoat layer, a magnetic layer, and a protective layer. According to need, a shield layer may be interposed between the substrate and the undercoat layer, and each layer may be made to have a multilayer structure by forming a buffer layer or shield layer therefor.

This information recording medium is used to assemble an information recording device such as, e.g., a hard disk by a known method. The undercoat film, magnetic film, and protective film are not particularly limited in kind, thickness, and means for deposition. In the case of using a glass substrate, it is preferred to use Ni—Al as a shield layer, a chromium alloy as the undercoat layer, and a cobalt alloy as the magnetic layer from the standpoint of securing excellent information recording/reproducing characteristics and excellent film adhesion. Sputtering is usually employed as a means for film deposition. This film deposition technique is advantageous in that the shapes of the surface recesses and protrusions of the substrate are wholly maintained. After the film deposition, the coated substrate may be subjected to a tape burnishing treatment, whereby the dust particles and fouling substances adherent to the protective film can be removed. This information recording medium is less apt to arouse the problem of head crushing or thermal asperities even when used at a reduced flying height, because the shapes of the surface recesses and protrusions of the substrate are wholly reflected thereon. The information recording device employing this information recording medium can realize a higher information recording density and a higher speed of recording/reproducing.

For this information recording device, the design flying height of a magnetic head is preferably from 110 to 200% of the BH04 of the substrate. When the design flying height is within this range, both the certainty of information recording and higher-density information recording are attained. If the design flying height is below 110% of the BH04, the probability of contact between a magnetic head and the information recording medium increases and the possibility of head crushing increases in proportion to the period of use of the device. On the other hand, if the design flying height exceeds 200%, the performances of the substrate cannot be fully exhibited and a higher recording density is difficult to realize.

The information recording device is preferably of the ramp road type. This is because the ramp road type does not necessitate a CSS zone because of its constitution and, hence, the design of substrate shape and the management of substrate production are easy. In the CSS type, a data zone and a CSS zone should be formed on the same substrate and, hence, the design of substrate shape and the management of substrate production are more complicated than those in the ramp road type. Consequently, the ramp road type is preferred from the standpoint of producing a high-performance inexpensive substrate and information recording device by a simpler process.

The invention will be explained below in more detail by reference to Examples and Comparative Examples.

EXAMPLES 1 TO 5

A ring-form aluminosilicate glass A (67% $SiO_2$, 10% $Al_2O_3$, 7% $Li_2O$, 8.7% $Na_2O$, 3% MgO, 4% CaO, and 0.3% $K_2O$)having a thickness of 0.6 mm, outer diameter of 65 mm, and inner diameter of 20 mm was polished with an abrasive material containing cerium oxide (Milake, manufactured by Mitsui Mining & Smelting Co., Ltd.) using a suede pad. Thereafter, the ring glass was rinsed in a shower of pure water to remove most of the abrasive material adherent to the surface thereof.

Subsequently, this ring glass was immersed for 3.0 minutes in an aqueous hydrofluoric acid solution having a concentration of from 0.02 to 0.06% by weight kept at 50° C. while applying 48 kHz ultrasonic thereto at 1 $W/cm^2$, and then sufficiently rinsed in a pure-water bath. The glass was then immersed in a bath of a commercial alkali detergent (pH, 11.5; RB25, manufactured by K.K. Chemical Products) while applying 48 kHz ultrasonic thereto at 1 $W/cm^2$, and then rinsed in a pure-water bath. This operation was repeated three times. Thereafter, the glass was dried in isopropyl alcohol vapor for 1 minute to produce a glass substrate.

The shapes of surface recesses and protrusions of this substrate were examined with an AFM for BH04, BH01, and $R_a$. As the AFM was used nano-scope III, manufactured by DI. The range of examination was set at 10 $\mu$m square. The results obtained are shown in Table 1.

On this substrate were successively deposited an Ni—Al shield layer, a Cr—Mo undercoat layer, a Co—Cr—Pt magnetic layer, and a carbon-based protective layer by sputtering. A perfluoropolyether lubricating film was further formed by the immersion method. Thus, information recording media were produced. Prior to the film deposition, the substrate may be subjected to chemical strengthening.

[Examination of Performances of Information Recording Media]

These information recording media were subjected to a 24-hour fixed-point flying test at a reduced pressure (200 Torr=26.7 kPa). As a result, head crushing did not occur in each Example. After this test, the surface of the magnetic head and that of each information recording medium were examined with an optical microscope. As a result, neither mars nor fouling was observed. Furthermore, these information recording media each was set in a hard disk drive in a given way to conduct a continuous seeking test at a flying height of 15 nm and a rotational speed of 10,000 rpm for 1,000 hours. As a result, head crushing did not occur in each Example. The results obtained are shown in Table 1.

EXAMPLES 6 TO 10

Glass substrates were produced in the same manner as in Example 1, except that hydrosilicofluoric acid was used in place of hydrofluoric acid and the concentration of the aqueous solution thereof was adjusted to a value in the range of from 0.1 to 0.5% by weight. These substrates were examined for the shapes of surface recesses and protrusions and subjected to the fixed-point flying test at a reduced pressure, in the same manners as in Example 1. The results obtained are shown in Table 1. Head crushing did not occur in each Example. After the test, neither mars nor fouling was observed on the surface of the magnetic head and that of each information recording medium.

EXAMPLES 11 TO 15

Glass substrates were produced in the same manner as in Example 1, except that an aluminosilicate glass B (65% $SiO_2$, 10% $Al_2O_3$, 7% $Li_2O$, 10.7% $Na_2O$, 3% MgO, 4% CaO, and 0.3% $K_2O$)was etched with an aqueous hydrofluoric acid solution having a concentration of from 0.003 to 0.015% by weight. These substrates were examined for the shapes of surface recesses and protrusions and subjected to the fixed-point flying test at a reduced pressure, in the same manners as in Example 1. The results obtained are shown in Table 1. Head crushing did not occur in each Example. After the test, neither mars nor fouling was observed on the surface of the magnetic head and that of each information recording medium.

EXAMPLES 16 TO 20

Glass substrates were produced in the same manner as in Example 6, except that the aluminosilicate glass B was etched with an aqueous hydrosilicofluoric acid solution having a concentration of from 0.03 to 0.15% by weight. These substrates were examined for the shapes of surface recesses and protrusions and subjected to the fixed-point flying test at a reduced pressure, in the same manners as in Example 1. The results obtained are shown in Table 1. Head crushing did not occur in each Example. After the test, neither mars nor fouling was observed on the surface of the magnetic head and that of each information recording medium.

TABLE 1

| Example | Substrate | Hydrofluoric acid (*1) | Hydrosilicofluoric acid (*1) | Alkali detergent (pH) | BH01 (nm) | BH04 (nm) | $R_s$ (nm) | Fixed-point flying Mar *2 | Fixed-point flying Head *3 | Continuous seeking *4 |
|---|---|---|---|---|---|---|---|---|---|---|
| 1 | A | 0.02 | 0 | 11.5 | 2.9 | 2.4 | 0.35 | none | not occurred | not occurred |
| 2 | A | 0.03 | 0 | 11.5 | 3.8 | 3.2 | 0.43 | none | not occurred | not occurred |
| 3 | A | 0.04 | 0 | 11.5 | 4.5 | 3.9 | 0.46 | none | not oc- | not oc- |

TABLE 1-continued

| Example | Substrate | Hydrofluoric acid (*1) | Hydrosilicofluoric acid (*1) | Alkali detergent (pH) | BH01 (nm) | BH04 (nm) | $R_s$ (nm) | Fixed-point flying Mar *2 | Fixed-point flying Head *3 | Continuous seeking *4 |
|---|---|---|---|---|---|---|---|---|---|---|
| 4 | A | 0.05 | 0 | 11.5 | 5.6 | 4.4 | 0.58 | none | not occurred | not occurred |
| 5 | A | 0.06 | 0 | 11.5 | 7.7 | 5.1 | 0.6 | none | not occurred | not occurred |
| 6 | A | 0 | 0.1 | 11.5 | 3.1 | 2.5 | 0.38 | none | not occurred | — |
| 7 | A | 0 | 0.2 | 11.5 | 4.3 | 3.4 | 0.47 | none | not occurred | — |
| 8 | A | 0 | 0.3 | 11.5 | 5.1 | 4 | 0.54 | none | not occurred | — |
| 9 | A | 0 | 0.4 | 11.5 | 5.9 | 4.9 | 0.64 | none | not occurred | — |
| 10 | A | 0 | 0.5 | 11.5 | 7.3 | 6.1 | 0.72 | none | not occurred | — |
| 11 | B | 0.003 | 0 | 11.5 | 2.7 | 2.2 | 0.32 | none | not occurred | — |
| 12 | B | 0.006 | 0 | 11.5 | 3.6 | 3.1 | 0.41 | none | not occurred | — |
| 13 | B | 0.009 | 0 | 11.5 | 4.4 | 3.5 | 0.42 | none | not occurred | — |
| 14 | B | 0.012 | 0 | 11.5 | 5.5 | 4.6 | 0.61 | none | not occurred | — |
| 15 | B | 0.015 | 0 | 11.5 | 7.9 | 5.8 | 0.69 | none | not occurred | — |
| 16 | B | 0 | 0.03 | 11.5 | 3.1 | 2.4 | 0.4 | none | not occurred | — |
| 17 | B | 0 | 0.06 | 11.5 | 4.2 | 3.3 | 0.49 | none | not occurred | — |
| 18 | B | 0 | 0.09 | 11.5 | 4.9 | 4.1 | 0.55 | none | not occurred | — |
| 19 | B | 0 | 0.12 | 11.5 | 6.4 | 5.4 | 0.69 | none | not occurred | — |
| 20 | B | 0 | 0.15 | 11.5 | 7.8 | 6.3 | 0.7 | none | not occurred | — |

(Note)
*1: (wt %)
*2: mars or fouling after the fixed-point flying test (24 hr) at reduced pressure
*3: head crushing in the fixed-point flying test (24 hr) at reduced pressure
*4: head crushing in the 1,000-hr drive test

COMPARATIVE EXAMPLES 1 TO 4

Glass substrates were produced in the same manner as in Example 1, except that the concentration of the aqueous hydrofluoric acid solution was changed to 0.005, 0.01, 0.08, and 0.1% by weight. These substrates were examined for the shapes of surface recesses and protrusions and subjected to the fixed-point flying test at a reduced pressure, in the same manners as in Example 1. The results obtained are shown in Table 2. When the concentration of the aqueous hydrofluoric acid solution was too low, the substrates obtained had a BH04 smaller than 2 nm and caused head crushing in the fixed-point flying test. On the other hand, when the concentration thereof was too high, the substrates obtained had a BH04 larger than 7 nm. In this case, the substrates caused head crushing in the fixed-point flying test, and the magnetic head and each information recording medium had mars or a fouling substance adherent to the surface thereof.

COMPARATIVE EXAMPLES 5 TO 8

Glass substrates were produced in the same manner as in Example 6, except that the concentration of the aqueous hydrosilicofluoric acid solution was changed to 0.02, 0.05, 0.8, and 1.0% by weight. These substrates were examined for the shapes of surface recesses and protrusions and subjected to the fixed-point flying test at a reduced pressure, in the same manners as in Example 1. The results obtained are shown in Table 2. When the concentration of the aqueous hydrosilicofluoric acid solution was too low, the substrates obtained had a BH04 smaller than 2 nm and caused head crushing in the fixed-point flying test. On the other hand, when the concentration thereof was too high, the substrates obtained had a BH04 larger than 7 nm. In this case, the magnetic head and each information recording medium, after the fixed-point flying test, had mars or a fouling substance adherent to the surface thereof.

COMPARATIVE EXAMPLES 9 TO 12

Glass substrates were produced in the same manner as in Example 11, except that the concentration of the aqueous hydrofluoric acid solution was changed to 0.001, 0.002, 0.020, and 0.03% by weight. These substrates were examined for the shapes of surface recesses and protrusions and subjected to the fixed-point flying test at a reduced pressure, in the same manners as in Example 1. The results obtained are shown in Table 2. When the concentration of the aqueous hydrofluoric acid solution was too low, the substrates obtained had a BH04 smaller than 2 nm and caused head crushing in the fixed-point flying test. On the other hand, when the concentration thereof was too high, the substrates obtained had a BH04 larger than 7 nm. In this case, the magnetic head and each information recording medium, after the fixed-point flying test, had mars or a fouling substance adherent to the surface thereof, and the substrates caused head crushing in the test.

COMPARATIVE EXAMPLES 13 TO 16

Glass substrates were produced in the same manner as in Example 16, except that the concentration of the aqueous hydrosilicofluoric acid solution was changed to 0.01, 0.02, 0.2, and 0.25% by weight. These substrates were examined for the shapes of surface recesses and protrusions and subjected to the fixed-point flying test at a reduced pressure, in the same manners as in Example 1. The results obtained are shown in Table 2. When the concentration of the aqueous hydrosilicofluoric acid solution was too low, the substrates obtained had a BH04 smaller than 2 nm and caused head crushing in the fixed-point flying test. On the other hand, when the concentration thereof was too high, the substrates obtained had a BH04 larger than 7 nm. In this case, the magnetic head and each information recording medium, after the fixed-point flying test, had mars or a fouling substance adherent to the surface thereof, and the substrates caused head crushing in the test.

0 to 2% zirconium oxide ($ZrO_2$) and which has surface recesses and protrusions wherein the height thereof at a contact proportion for the recesses and protrusions of 0.4% is from 2 to 7 nm when the height of the recesses and protrusions at a contact proportion therefor of 50% is taken as a base.

Because of the constitutions described above, the invention produces the following effects.

Since the substrate of the invention has a BH04 of from 2 to 7 nm, it contributes to a reduction in flying height and causes neither head crushing nor thermal asperities.

In one preferred embodiment of the substrate of the invention, since the BH01 thereof is from 2 to 10 nm, it can prevent head crushing without fail, besides producing the effect described above.

In another preferred embodiment of the substrate of the invention, since the protrusions present on the substrate surface have a diameter of from 10 to 1,000 nm, the substrate is effective in optimizing both the mechanical durability of the protrusions and information recording/reproducing characteristics, besides producing the effects described above.

In still another preferred embodiment of the substrate of the invention, since the base material is a glass or crystallized glass, the substrate can be easily made to have high

TABLE 2

| Comp. Ex. | Sub-strate | Hydro-fluoric acid (*1) | Hydro-silico-fluoric acid (*1) | Alkali detergent (pH) | BH01 (nm) | BH04 (nm) | $R_s$ (nm) | Fixed-point flying Mar *2 | Fixed-point flying Head *3 | Continuous seeking *4 |
|---|---|---|---|---|---|---|---|---|---|---|
| 1 | A | 0.005 | 0 | 11.5 | 1.7 | 1.1 | 0.25 | present | occurred | — |
| 2 | A | 0.01 | 0 | 11.5 | 2.1 | 1.6 | 0.28 | present | occurred | — |
| 3 | A | 0.08 | 0 | 11.5 | 9.6 | 7.2 | 0.74 | present | not occurred | — |
| 4 | A | 0.1 | 0 | 11.5 | 11.2 | 8.7 | 0.85 | present | occurred | — |
| 5 | A | 0 | 0.02 | 11.5 | 1.8 | 1.1 | 0.22 | present | occurred | — |
| 6 | A | 0 | 0.05 | 11.5 | 2.2 | 1.6 | 0.27 | present | occurred | — |
| 7 | A | 0 | 0.8 | 11.5 | 9.1 | 7.3 | 0.71 | present | not occurred | — |
| 8 | A | 0 | 1 | 11.5 | 10.5 | 8.9 | 0.85 | present | not occurred | — |
| 9 | B | 0.001 | 0 | 11.5 | 1.4 | 0.9 | 0.22 | present | occurred | — |
| 10 | B | 0.002 | 0 | 11.5 | 1.8 | 1.2 | 0.27 | present | not occurred | — |
| 11 | B | 0.02 | 0 | 11.5 | 10.2 | 7.6 | 0.78 | present | occurred | — |
| 12 | B | 0.03 | 0 | 11.5 | 13.4 | 9.4 | 0.91 | present | occurred | — |
| 13 | B | 0 | 0.01 | 11.5 | 1.9 | 1 | 0.23 | present | occurred | — |
| 14 | B | 0 | 0.02 | 11.5 | 2.4 | 1.7 | 0.29 | present | occurred | — |
| 15 | B | 0 | 0.2 | 11.5 | 9.4 | 7.5 | 0.74 | present | not occurred | — |
| 16 | B | 0 | 0.25 | 11.5 | 10.2 | 8.8 | 0.83 | present | occurred | — |

(Note)
*1: (wt %)
*2: mars or fouling after the fixed-point flying test (24 hr) at reduced pressure
*3: head crushing in the fixed-point flying test (24 hr) at reduced pressure
*4: head crushing in the 1,000-hr drive test The modes of the invention can be modified into the following embodiment.

(a) A substrate for information recording media which is a glass substrate obtained by etching a glass comprising 62 to 69% silicon dioxide ($SiO_2$), 6 to 12% aluminum oxide ($Al_2O_3$), 5 to 14% lithium oxide ($Li_2O$), 6 to 14% sodium oxide ($Na_2O$), 0 to 3% potassium oxide ($K_2O$), 0 to 5% magnesium oxide (MgO), 0 to 7% calcium oxide (CaO) (the total content of magnesium oxide (MgO) and calcium oxide (CaO) is 0.5 to 12%), 0 to 3% titanium dioxide ($TiO_2$), and surface smoothness, a high modulus of elasticity, and high rigidity and strength, besides producing the effects described above.

According to the process for substrate production of the invention, since a glass substrate is immersed in an acid and an aqueous alkali solution, the desired surface shape can be formed without fail by a simple means.

The information recording medium of the invention has high surface smoothness and is less apt to cause head crushing, because it comprises the substrate and, successively deposited thereon, at least an undercoat film, a magnetic film, and a protective film.

The information recording device of the invention has high reliability even in a low-pressure severe environment, has a long life, and is inexpensive, because it employs the information recording medium of the invention.

In a preferred embodiment of the information recording device of the invention, since it is of the ramp road type, a CSS zone is essentially unnecessary on the substrate surface, and substrate design and production are easy.

What is claimed is:

1. A substrate for information recording media which has surface recesses and protrusions wherein the height thereof at a contact proportion for the recesses and protrusions of 0.4% as determined with an atomic force microscope (AFM) is from 2 to 7 nm when the height of the recesses and protrusions at a contact proportion therefor of 50% is taken as a base.

2. The substrate for information recording media as claimed in claim 1, wherein the height of the surface recesses and protrusions at a contact proportion therefor of 0.1% is from 2 to 10 nm.

3. The substrate for information recording media as claimed in claim 1, wherein the protrusions in the surface recesses and protrusions have a diameter of from 10 to 1,000 nm.

4. The substrate for information recording media as claimed in claim 1, which comprises an amorphous glass or a crystallized glass as the base material.

5. A process for producing a substrate for information recording media which comprises immersing an information recording medium substrate comprising a glass or crystallized glass as the base material in an acid and an aqueous alkali solution to thereby form a substrate for information recording media which has surface recesses and protrusions wherein the height thereof at a contact proportion for the recesses and protrusions of 0.4% as determined with an atomic force microscope (AFM) is from 2 to 7 nm when the height of the recesses protrusions at a contact proportion therefor of 50% is taken a base.

6. An information recording medium which comprises the substrate for information recording media as claimed in claim 1 and, successively deposited thereon, at least an undercoat film, a magnetic film, and a protective film.

7. An information recording device using the information recording medium as claimed in claim 6.

8. The information recording device as claimed in claim 7, which is of a ramp road type.

* * * * *